US007519874B2

(12) United States Patent
Salant et al.

(10) Patent No.: US 7,519,874 B2
(45) Date of Patent: *Apr. 14, 2009

(54) METHOD AND APPARATUS FOR BIT ERROR RATE ANALYSIS

(75) Inventors: Lawrence Salant, New Hempstead, NY (US); Thierry Campiche, Geneva (CH); Martin Miller, Avusy (CH); Michael Schnecker, Doylestown, PA (US)

(73) Assignee: LeCroy Corporation, Chestnut Ridge, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 10/673,712

(22) Filed: Sep. 29, 2003

(65) Prior Publication Data

US 2004/0123191 A1   Jun. 24, 2004

Related U.S. Application Data

(60) Provisional application No. 60/415,155, filed on Sep. 30, 2002.

(51) Int. Cl.
*G06F 11/00* (2006.01)

(52) U.S. Cl. ..................................... 714/704
(58) Field of Classification Search ............ 714/704
See application file for complete search history.

(56) References Cited

U.S. PATENT DOCUMENTS 3,449,671 A    6/1969   Long
3,562,710 A    2/1971   Halleck
3,778,550 A   12/1973   David et al.
4,100,531 A    7/1978   Fletcher
4,375,694 A    3/1983   Kuhn
4,566,100 A *  1/1986   Mizuno et al. ............ 714/704
4,615,040 A    9/1986   Mojoli et al.
4,633,465 A   12/1986   Fitch et al.
4,680,778 A    7/1987   Krinock
4,694,244 A    9/1987   Whiteside et al.

(Continued)

FOREIGN PATENT DOCUMENTS

DE           2462046 A1    11/1975

(Continued)

OTHER PUBLICATIONS

Roland E. Best, *The Software PLL, Phase Locked Loops*, 3rd Edition, McGraw-Hill, New York, 1997, pp. 229-249.

(Continued)

*Primary Examiner*—Jacques Louis-Jacques
*Assistant Examiner*—Guerrier Merant
(74) *Attorney, Agent, or Firm*—Frommer Lawrence & Haug LLP; William S. Frommer (57) ABSTRACT

A method and apparatus for determining a bit error rate. The method comprises the steps of acquiring a data signal by an acquisition unit of a test instrument for a predetermined period of time, and storing the data signal in a memory of the test instrument. A clock signal is recovered from the stored data signal, and in accordance therewith, the stored data signal is sliced into a plurality of data segments of a predetermined length. Each of said data segments is synchronized to a frame or predetermined pattern to determine a bit error rate thereof.

18 Claims, 8 Drawing Sheets

U.S. PATENT DOCUMENTS

| | | | |
|---|---|---|---|
| 4,758,963 | A | 7/1988 | Gordon et al. |
| 4,843,309 | A | 6/1989 | Kareem et al. |
| 4,876,655 | A | 10/1989 | Carlton et al. |
| 4,964,117 | A | 10/1990 | Shier |
| 5,159,609 | A | 10/1992 | Palicot |
| 5,180,971 | A | 1/1993 | Montijo |
| 5,214,784 | A | 5/1993 | Ward et al. |
| 5,222,101 | A | 6/1993 | Ariyavisitakul |
| 5,305,635 | A | 4/1994 | James et al. |
| 5,337,403 | A | 8/1994 | Klingman |
| 5,402,443 | A | 3/1995 | Wong |
| 5,432,791 | A | 7/1995 | Gancarcik |
| 5,631,759 | A | 5/1997 | Bogdan et al. |
| 5,654,987 | A | 8/1997 | Nakamura |
| 5,714,878 | A | 2/1998 | Saito et al. |
| 5,726,607 | A | 3/1998 | Brede et al. |
| 5,761,216 | A | 6/1998 | Sotome |
| 5,761,434 | A | 6/1998 | Hewitt |
| 5,761,537 | A | 6/1998 | Sturges et al. |
| 5,789,954 | A | 8/1998 | Toeppen et al. |
| 5,825,825 | A | 10/1998 | Altmann et al. |
| 5,900,755 | A | 5/1999 | Toeppen et al. |
| 5,907,587 | A | 5/1999 | Sokoler |
| 5,914,592 | A | 6/1999 | Saito |
| 5,943,378 | A | 8/1999 | Keba et al. |
| 5,953,071 | A | 9/1999 | Van Zon |
| 5,966,684 | A | 10/1999 | Richardson et al. |
| 5,978,742 | A | 11/1999 | Pirkerd |
| 5,999,163 | A | 12/1999 | Ivers et al. |
| 6,009,132 | A | 12/1999 | Sholtz |
| 6,044,123 | A | 3/2000 | Takla |
| 6,112,160 | A | 8/2000 | Salant et al. |
| 6,188,737 | B1 | 2/2001 | Bruce et al. |
| 6,212,246 | B1 | 4/2001 | Hendrickson |
| 6,215,363 | B1 | 4/2001 | Conta et al. |
| 6,278,357 | B1 | 8/2001 | Croushore et al. |
| 6,295,327 | B1 | 9/2001 | Takla |
| 6,311,138 | B2 | 10/2001 | Miller |
| 6,356,127 | B1 | 3/2002 | Klipper et al. |
| 6,366,631 | B1 | 4/2002 | Nakayama et al. |
| 6,407,970 | B2 | 6/2002 | Verboom |
| 6,445,230 | B1 | 9/2002 | Rupp et al. |
| 6,463,109 | B1 | 10/2002 | McCormack et al. |
| 6,522,122 | B2 | 2/2003 | Watanabe et al. |
| 6,539,318 | B2 | 3/2003 | Miller et al. |
| 6,546,345 | B1 | 4/2003 | Ghiasi |
| 6,549,859 | B1 | 4/2003 | Ward |
| 6,571,186 | B1 | 5/2003 | Ward |
| 6,615,148 | B2 | 9/2003 | Pickerd |
| 6,642,926 | B1 | 11/2003 | Letts |
| 6,643,346 | B1 | 11/2003 | Pedrotti et al. |
| 6,647,523 | B2 | 11/2003 | Manning |
| 6,675,328 | B1 | 1/2004 | Krishnamachari |
| 6,738,922 | B1 | 5/2004 | Warwar et al. |
| 6,812,688 | B2 | 11/2004 | Tan et al. |
| 6,836,738 | B2 * | 12/2004 | Sepp et al. .................. 702/67 |
| 6,850,852 | B1 * | 2/2005 | Ferguson et al. ............. 702/67 |
| 6,853,696 | B1 | 2/2005 | Moser et al. |
| 6,922,384 | B2 * | 7/2005 | Miyashita et al. ........ 369/59.22 |
| 6,996,202 | B2 | 2/2006 | McCormack et al. |
| 2001/0021151 | A1 | 9/2001 | Verboom et al. |
| 2002/0018572 | A1 * | 2/2002 | Rhoads .......................... 381/1 |
| 2002/0034337 | A1 * | 3/2002 | Shekter ...................... 382/275 |
| 2002/0128787 | A1 * | 9/2002 | Seng et al. .................... 702/69 |
| 2003/0004664 | A1 | 1/2003 | Ward et al. |
| 2003/0163266 | A1 | 8/2003 | Ward et al. |
| 2004/0123018 | A1 | 6/2004 | Miller et al. |
| 2004/0123191 | A1 | 6/2004 | Salant et al. |
| 2004/0123208 | A1 | 6/2004 | Miller et al. |
| 2004/0153883 | A1 | 8/2004 | Miller et al. |

FOREIGN PATENT DOCUMENTS

| | | |
|---|---|---|
| EP | 0 241 142 | 10/1987 |
| EP | 0 444 875 | 9/1991 |
| EP | 0 631 143 | 12/1994 |
| EP | 1 074 845 | 2/2001 |
| EP | 1 118 866 | 7/2001 |
| EP | 1 244 241 | 9/2002 |
| GB | 2 138 575 A | 10/1984 |
| JP | 62003544 | 1/1987 |
| JP | 4105070 | 4/1992 |
| JP | 5196641 | 8/1993 |
| JP | 5264595 | 10/1993 |
| JP | 9005362 | 1/1997 |
| JP | 10163859 | 6/1998 |
| JP | 11098876 | 4/1999 |
| JP | 8220144 | 6/1999 |
| WO | WO 00/60806 | 10/2000 |
| WO | WO 2004 032049 A2 | 4/2004 |

OTHER PUBLICATIONS

*Using FPGAs for Digital Applications*, Actel Corporation, Apr. 1996.

HP E4543A Q Factor and Eye Contours Application Software, Hewlett Packard, 1999.

Infiniium DCA, Agilent Technologies, Mar. 7, 2002.

Communication waveform measurements, Hewlett Packard, Jun. 26, 1996.

Advanced Analysis of High-Speed Digital Communication Waveforms, Hewlett Packard, Jun. 27, 1994.

R.E. Anderson and E. M. Foster, Design of an MPEG-2 Transport Demultiplexor Core, IBM, 1999.

Technology Standards, Tektronix Website (www.tek.com/Measurement/Solutions/tech_standards/index.html?wt=257).

Communications Signal Analyzer, Tektronix Website (www.tektronix.com/optical).

RT-Eye™ Serial Data Compliance and Analysis Software, Tektronix Website (www.Tektronix.com/accessories).

Design of FIR Filters by Windowing, MIT Website, (http://web.mit.edu/6.555/www/fir.html).

A New Digital PLL at the Technische Unversitaet Berlin, Technische Unversitaet Berlin Website (www.tdl.com/'gottsch/tuberlin.htm).

Low Jitter Digital PLL—ZL30407, Zalink Semiconductor Website, (http://products.zarlink.com/product_portlets/new_timer.htm).

Michael K. Williams, et al., A Discussion of Methods for Measuring Low-Amplitude Jitter, International Test Conference, Paper 28.1, pp. 646-652.

Russ Brown, Quantam Corporation, "Eye Diagram Data", SCSI Physical Working Group, Feb. 9, 2000.

Dave Fink, Tektronix "Introduction to Measurement Techniques and Analysis of Emerging Serial Data Standards", Nov. 2002.

"Methodologies for Jitter Specification Technical Report" Rev 10, Jun. 9, 1999.

Andy Baldman, University of New Hampshire "Description of XAUI Physical Layer Measurements Performed At The UNH Interoperability Lab", Oct. 30, 2002.

University of New Hampshire Technical Document, "fast Ethernet" Feb. 13, 2003.

Dennis Derickson, Fiber Optic Test and Measurement (Chapter 8); Prentice Hall PTR, 1998, pp. 284-338.

Adam Healey et al., "Fast Ethernet Consortium—100 Base-TX PMD Test Suite", Version 2.4 and Version 2.5; InterOperability Lab, 1998-1999.

Adam Healey, "Fast Ethernet Consortium Notebook", 1996-1997 14 pps.

* cited by examiner

METHOD AND APPARATUS FOR BIT ERROR RATE ANALYSIS

CROSS REFERENCE TO RELATED APPLICATIONS

This application claims the benefit of U.S. Provisional Patent Application Ser. No. 60/415,155, filed Sep. 30, 2002, the entire contents of which is incorporated herein by reference.

FIELD OF THE INVENTION

The present invention relates to a method of bit error rate analysis for signals sampled in a digital oscilloscope.

BACKGROUND OF THE INVENTION

Bit error rate measurement is central to all serial data testing. All other measurements relate back to this one parameter which is the ultimate measurement of link quality. Oscilloscopes in general have typically measured bit error rates from an eye diagram or from a jitter bathtub curve. However, in very high sample acquisitions, these methods have proved unacceptable.

SUMMARY OF THE INVENTION

Software Bit Error Rate and Error Location Analysis

In accordance with the invention, the LeCroy® SDA computes a bit error rate by first collecting a long waveform acquisition of a bit pattern. Using a recovered periodic clock, the waveform is sampled at an optimum threshold level and the resulting sequence of bits is stored and compared with a known bit pattern. This bit pattern may be a standard pattern, a pseudo-randomly generated pattern, or a custom pattern. An automatic search algorithm is provided which aligns the known and measured patterns. Thus, only in the SDA in accordance with the invention may bit error rate be measured directly in software by using a software recovered clock to define a plurality of data segments, converting the data segments of the captured waveform to bits, which are then compared with a known data pattern.

Figure 1:
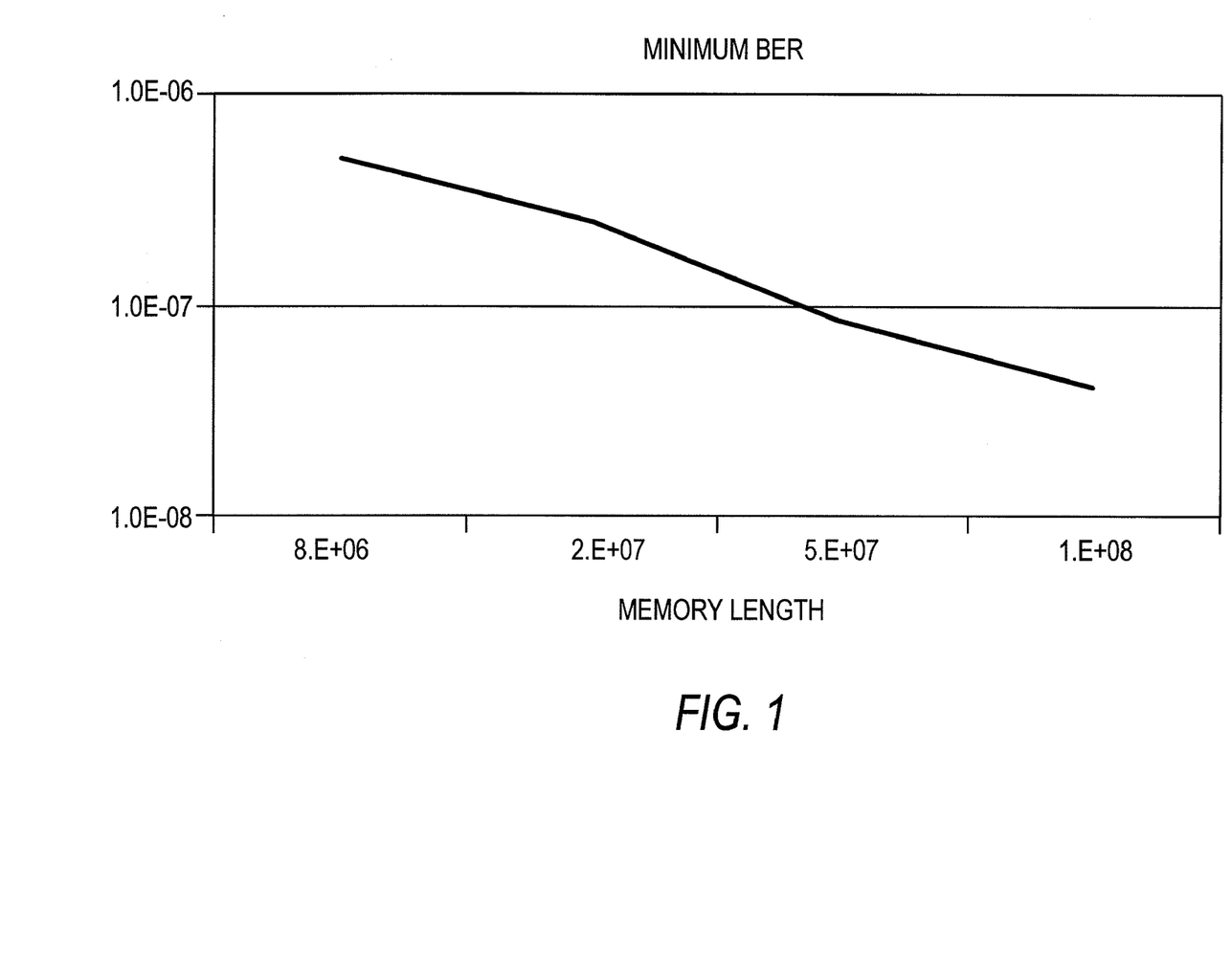
FIG. 1 is a graph depicting a relationship between an oscilloscope memory length and a minimum Bit Error Rate.

Bit Error Rate (BER) measures the actual bit error rate of a particular received signal using appropriate software. The following measurements can be computed:

Total Number of bit errors
Number of "zero" errors
Number of "one" errors
BER (bit error rate)—number of errors for a given number of bits tested This method of bit error rate measurement is limited to a minimum level set by the memory depth (size) and number of points per bit. Assuming 4 samples per bit, FIG. 1 summarizes this sensitivity for a single acquisition. Thus, as is shown, the greater the memory, the lower the BER that can be detected.

However, in accordance with current memory lengths found in digital oscilloscopes, this sensitivity limits the software measurement mode to fairly high bit error rates. Most serial links are expected to operate at error rates below 1E-9. This mode is most useful, however, in uncovering pattern dependent errors that are often higher than the 1E-9 rate.

The software BER mode described in accordance with the invention enables the instrument to display error locations within the data stream, as is noted below. The minimum bit error rate can be reduced by the use of multiple data acquisitions, if it is assumed that the errors are random and stationary i.e. they are not correlated in time.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Bit Error Location

Figure 2:
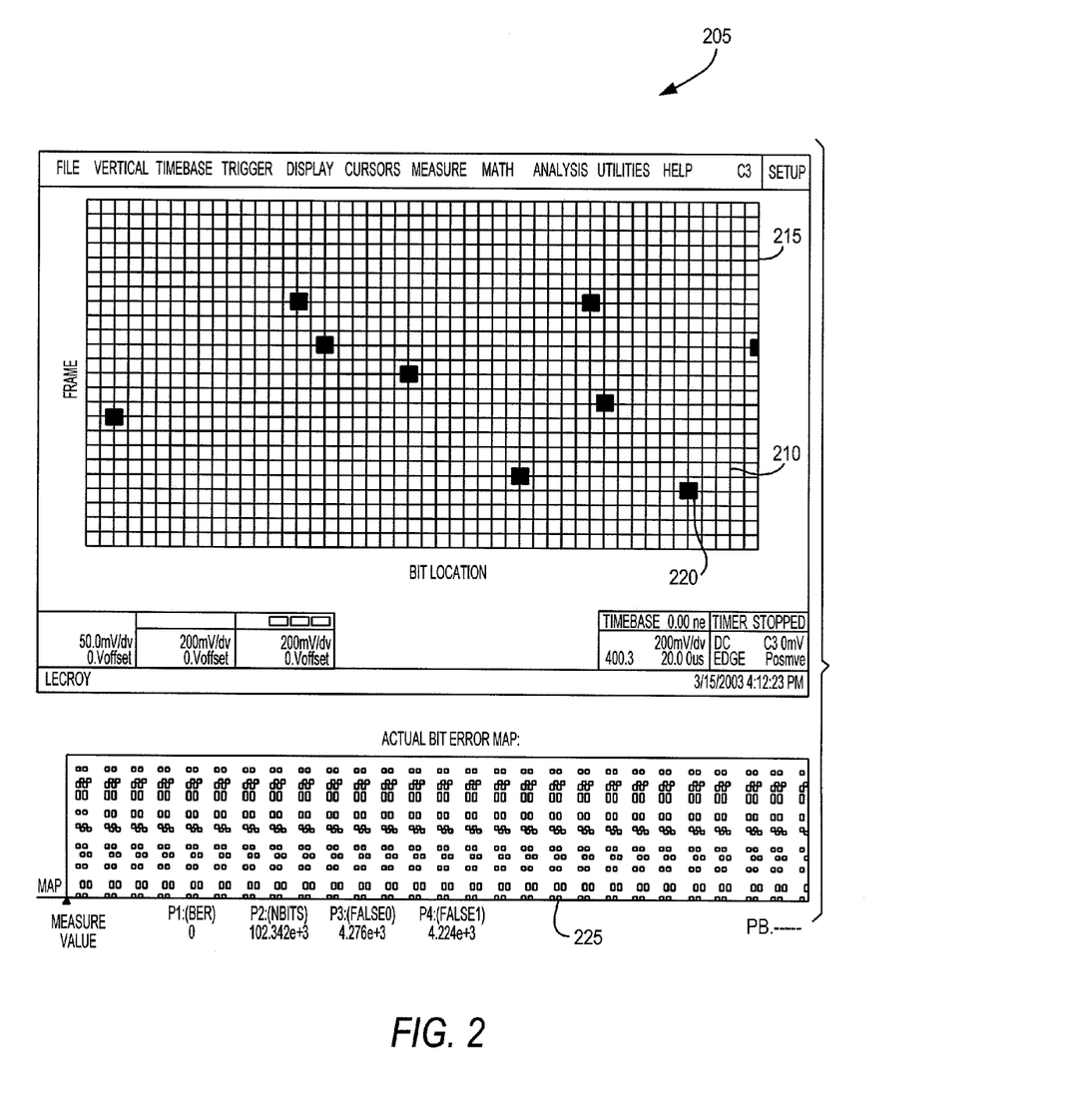
FIG. 2 is a bit error map which is a three dimensional plot showing the location of bit errors with a frame.

As is shown in FIG. 2, an actual bit error map, such as that shown at 225, is displayed to a user. Errors show up as a different color (white in the figure). Random errors show up as random spots, while any type of repetitive errors will be shown as a pattern, the particular pattern being indicative of the type of error. A representation of what this actual bit error map looks like is shown at display 205, and includes a 3-dimensional plot, where bit errors 220 are located within the input data stream. A display 205 divides the data stream into a row-column format 215 with the rows containing all of the bits 210 in a frame. A data frame is delimited either by a specific bit sequence (i.e. 0xF268 for SONET/SDH) that is user-selectable or a fixed number of bits. This display depicts frame-related error sources as vertical streaks, with the horizontal dimension being bit number and the vertical dimension being frame number. The location of a bit error will be displayed as a contrasting color on an x-y display.

Figure 3:
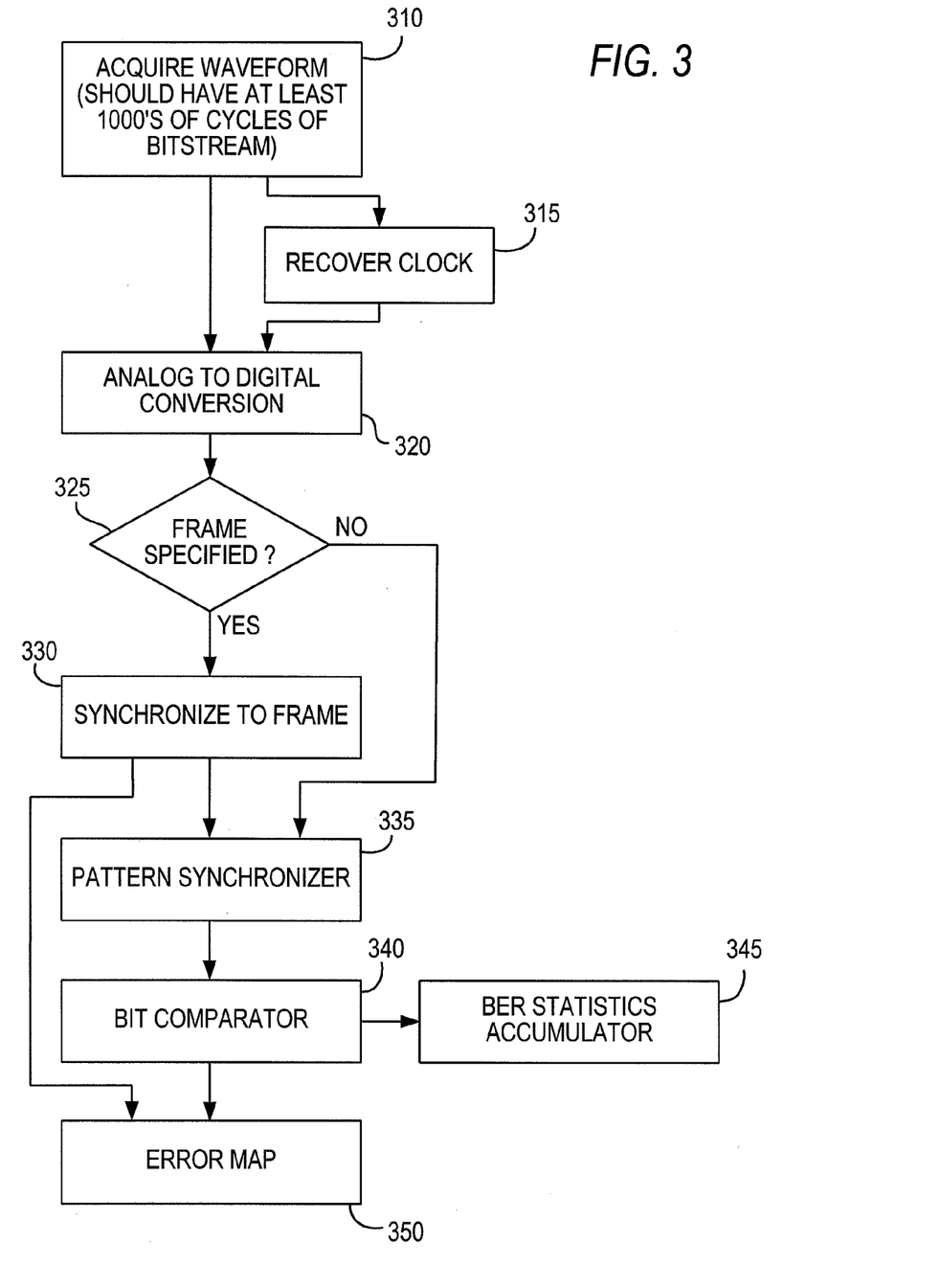
FIG. 3 is a flowchart diagram depicting the steps necessary to generate the row/column display of FIG. 2.

FIG. 3 shows the steps necessary to generate the bit error location map, these steps being described below.

Clock Recovery

At step 310 of FIG. 3 a waveform is acquired employing a single trigger, as will be described below, and at step 315 a clock is recovered therefrom. This acquisition of the data and recovery of the clock will now be described referring to FIG. 7, which is a flowchart diagram depicting the procedure for analyzing an acquired and stored waveform and generating a recovered virtual periodic clock associated with the stored waveform. In step 110 an acquired, stored data signal is retrieved from memory. Then, at step 115, in order to analyze the data signal for threshold crossings to subsequently define a series of "samples" acquired at nearly uniform sample-intervals, either an absolute or a relative (percentage of the recorded waveform's amplitude) vertical threshold is defined. At step 120, each portion of the data signal is compared with the threshold to locate pairs of adjacent samples of the data signal that straddle or span the threshold. That is, one sample is greater-than-or-equal-to the threshold and the adjacent sample is less-than-or-equal-to the threshold. Hysteresis requirements must also be taken into account before an identified sample pair can be accepted as a true independent threshold crossing point, thus eliminating local noise that would contribute to jitter. Thereafter, using either linear or non-linear interpolation, an estimate of the time of crossing through the threshold that is more precise than the sample interval is made at step 125. This defines an observed time of threshold crossing. At step 127, the phase of the virtual clock is initialized. This is accomplished by setting the initial phase equal to the time of threshold crossing of the first observed transition. (i.e. the first observed crossing time serving as an estimate of the recovered clock's initial phase). The initial phase must be further refined by one of several methods: either 1) the first N transitions in the data are discarded or 2) after some number, N transitions have been detected, the initial phase of the virtual clock is revised to give a mean time-error for these N transitions of zero, then processing is restarted. Both methods address the issue of PLL start-up or PLL acquisition time. The second of these procedures is appropriate to the case where it is desired to make the recovered clock perfectly periodic rather than tracking low frequency variations of the input data stream.

Figure 7:
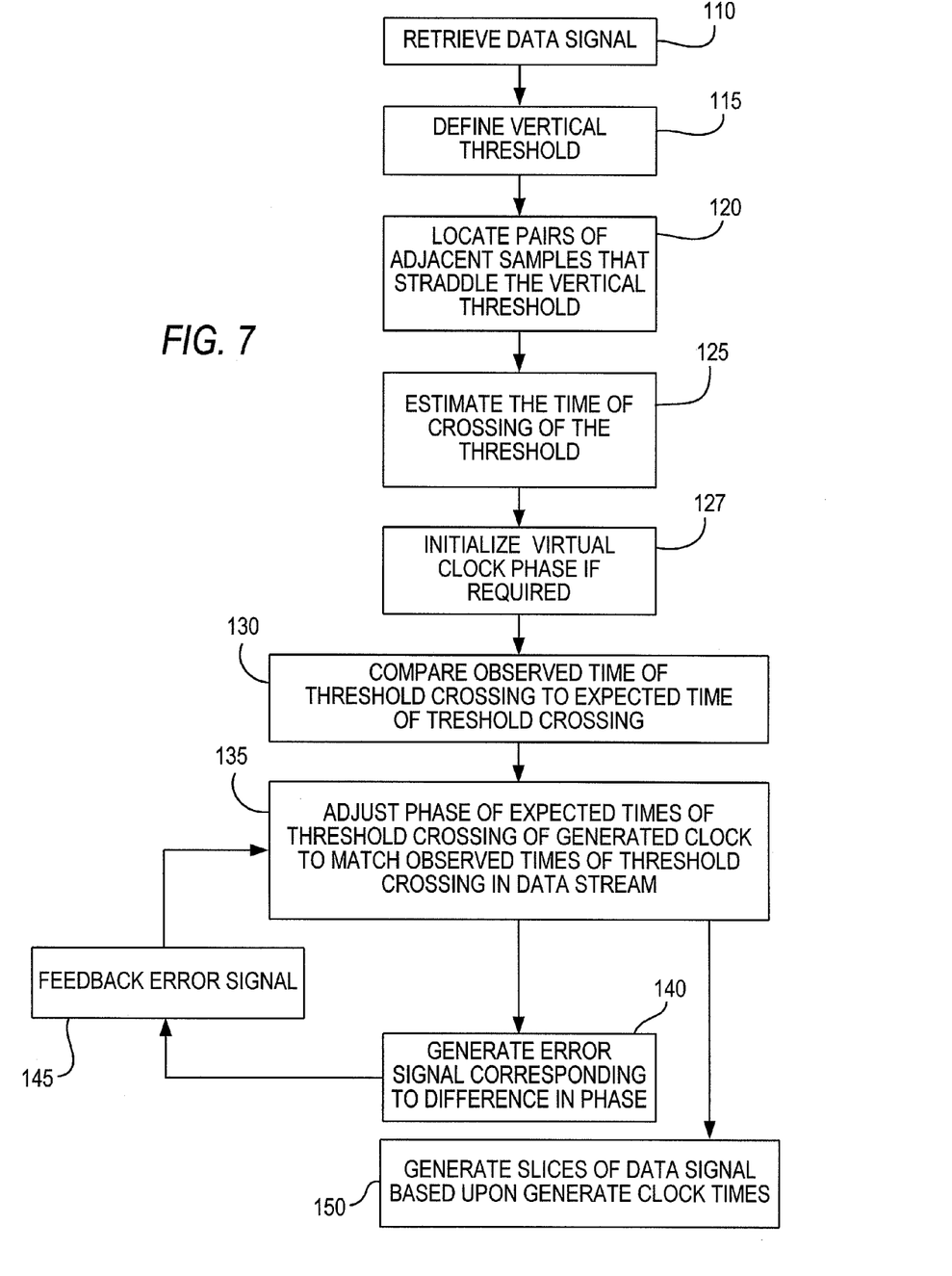
FIG. 7 is a flowchart diagram depicting the procedure for analyzing an acquired and stored waveform and generating a recovered clock associated therewith.

The observed times of threshold crossing are compared to an expected time of threshold crossing at step 130. The expected times of threshold crossing correspond to the regular intervals of an entirely conceptual or virtual "periodic clock" that is intended to correspond, after correction as noted below, to the sequence of expected times of threshold crossing.

The phase of the recovered clock is then adjusted to properly synchronize with the observed times of threshold crossing in the recorded data signal in step 135. The amount of phase adjustment in each bit interval is determined by mathematical algorithms precisely defining the dynamic response of the software PLL. The dynamic response of the PLL can be matched to the communications standard associated with the data signal under analysis under software control.

Because the recorded waveform under analysis is not necessarily of a clock but rather of a data stream presumably generated in accordance with a clock, a transition will not occur for each bit interval. That is, some transitions in the actual data signal may not be present because some consecutive bit locations may have the same value (consecutive logic "1", for example), and therefore not have a transition between them. It is possible to determine how many of these bit locations do not have transitions by assuming that the observed transitions have a correspondence with the closest expected transition of the generated virtual clock. As such, it is possible to associate every transition observed with a virtual clock transition, and to know exactly how many cycles of the generated virtual clock have passed since the previous observed transition.

As in an analog phase-locked-loop (PLL) a phase error (time interval error "TIE") between the expected value of a threshold crossing time determined in accordance with the recovered virtual periodic clock and the actual observed value of the threshold crossing time can be used as a feedback signal to alter the expected value of a threshold crossing time, and thus the phase of the recovered virtual clock, as is shown in step 140. In step 145 this generated error feedback signal is fed back and used at step 135 to adjust the phase of the expected time of threshold crossing. This procedure is repeated and continued until all the expected values of threshold crossing times, and therefore phase of the recovered virtual clock is locked to the actual observed values of the threshold crossing times. In accordance with the invention, the implementation is in software; the expected times being calculated by adding floating-point numbers rather than using resonating circuits, but the result being quite similar. The result is also more repeatable than the analog counterpart because the functionality does not depend on manufactured components that have initial inaccuracies and change over time and varying environmental conditions, but rather is a mathematical calculation. Thus, any additional jitter generated in accordance with physical generation of a clock signal is avoided.

By locking the expected time values of a threshold crossing to the actual observed values of the threshold crossing time, this expected value of a threshold crossing time can be used to derive the ideal "sampling times" of the digitally encoded signal in the recorded waveform, as is shown in step 150. These times are between the expected times of threshold crossing (when that data is NOT changing, rather than when it is changing). Having determined these expected values of time of threshold crossing, and thus ideal sampling times, the recorded waveform can be decoded according to these ideal sampling times (recovered periodic clock) to determine bit states of the data during each "slice" of the data signal.

Each slice of data is therefore obtained from a recorded signal of many bit transitions and by using the clock recovery system in accordance with the invention. The waveform of the data signal can therefore be sliced up and represented as a series of smaller waveforms (each derived from the original) but which span some number of bits from the original data signal in a precisely prescribed period of time. As such, a "slicer" serves the purpose of supplying such waveforms each of which is a subset of the waveform of the input data signal, and that are synchronized with the recovered clock (extracted from the same waveform), and for which the state of the bits in each slice are (or can be) known. Specifically, as displayed on an oscilloscope, it supplies waveforms with an effective trigger time corresponding to, for example, the first division (of ten) and an end of one bit interval (unit-interval) at the 9th division on the oscilloscope display, although other timing sequences may be employed as desired. As such these waveforms are ideal for further processing as they are precisely synchronized and in phase with the recovered virtual clock.

Then having determined this series of times (the times between the expected transitions) we are well prepared to "sample" the recorded waveform to determine bit states.

Analog to Digital Conversion

Figure 4:
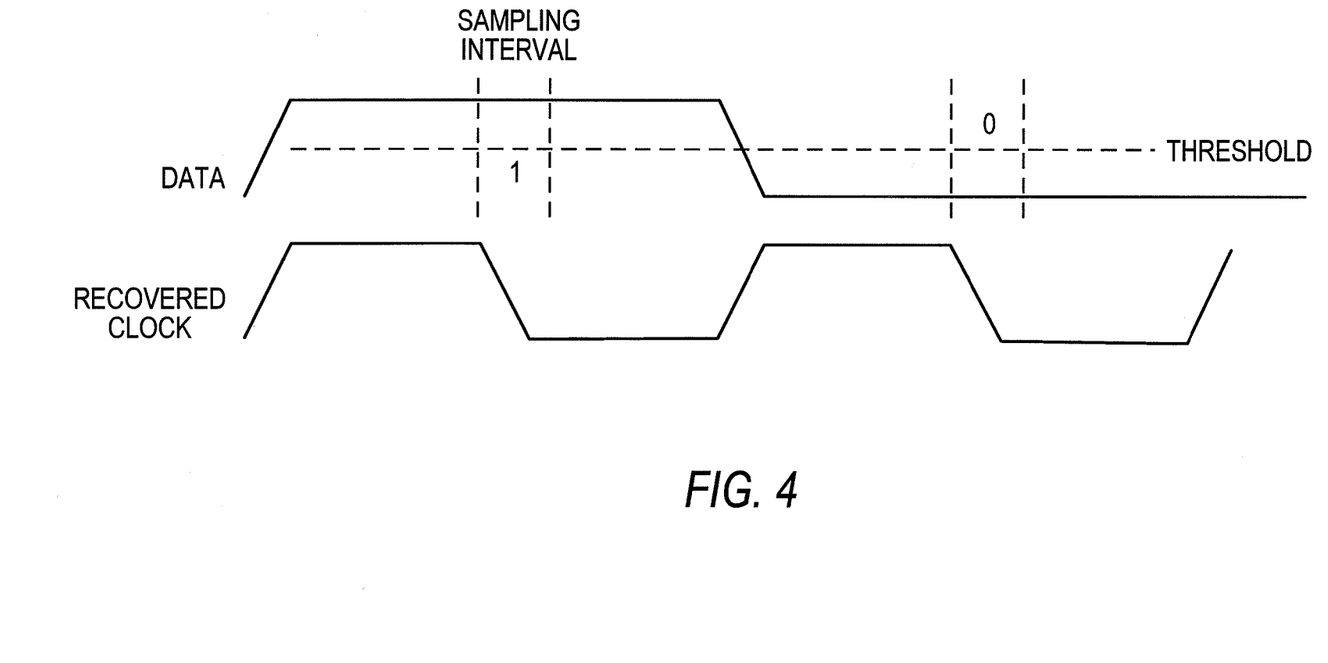
FIG. 4 is a graph depicting analog to digital conversion of the waveform based on the recovered clock.

Referring back to FIG. 3, at step 320 an analog to digital conversion (A/D) procedure receives the recovered clock from step 315, and received the acquired waveform from step 310. The procedure at step 320 is more completely described making reference to FIG. 4. In software, for each cycle of the recovered clock, the analog waveform is sampled and a digital bit is produced. If the analog value at the center of the recovered clock period is greater than or equal to a threshold level, the data is said to be a digital '1'. If it is less than the threshold, it is said to be a digital '0'. This procedure is applied to all portions of a waveform, in accordance with the recovered clock, to generate the digital data signal.

Synchronization

Referring once again to FIG. 3, at step 325, the procedure for synchronizing a frame or frameless data to be tested with a test sequence is undertaken. At step 325, an inquiry is made as to whether a frame synchronization is specified. If this inquiry is answered in the affirmative, at step 330 the bit stream provided by the analog to digital converter is divided into frames either by synchronizing to the specified header and/or by the number of bits. Once designated, the frame data designated bits of the reference signal are forwarded to step 335 for pattern synchronization. A sync indicator is also forwarded directly to an error map generating step 350 for generating the map shown in FIG. 2. Thus, if a frame is defined, the display map, and pattern synchronization are performed frame by frame.

If at step 325 the inquiry is answered in the negative, and it is determined that a frame size has not been specified, the digital data is forwarded directly to step 335 where the generated digital data segments are compared to one of a plurality of predetermined patterns. These predetermined patterns may comprise one of a standard pattern, pseudo-randomly generated pattern, or custom pattern stored in a data file.

Once the pattern has been selected and aligned, thereafter, at step 340, the bits of the data segments are compared to the designated pattern generated in step 335. During these comparisons, Bit Error Rate statistics are accumulated at step 345. Then at step 350, the Bit Error Map of FIG. 2 is generated.

The process of synchronization of frame data, if present, as described in step 335, and the comparison of the frame data or frameless data and either the standard pattern, the pseudo randomly generated pattern, or the custom pattern as described in step 340 will now be described with reference to FIG. 5.

Figure 5:
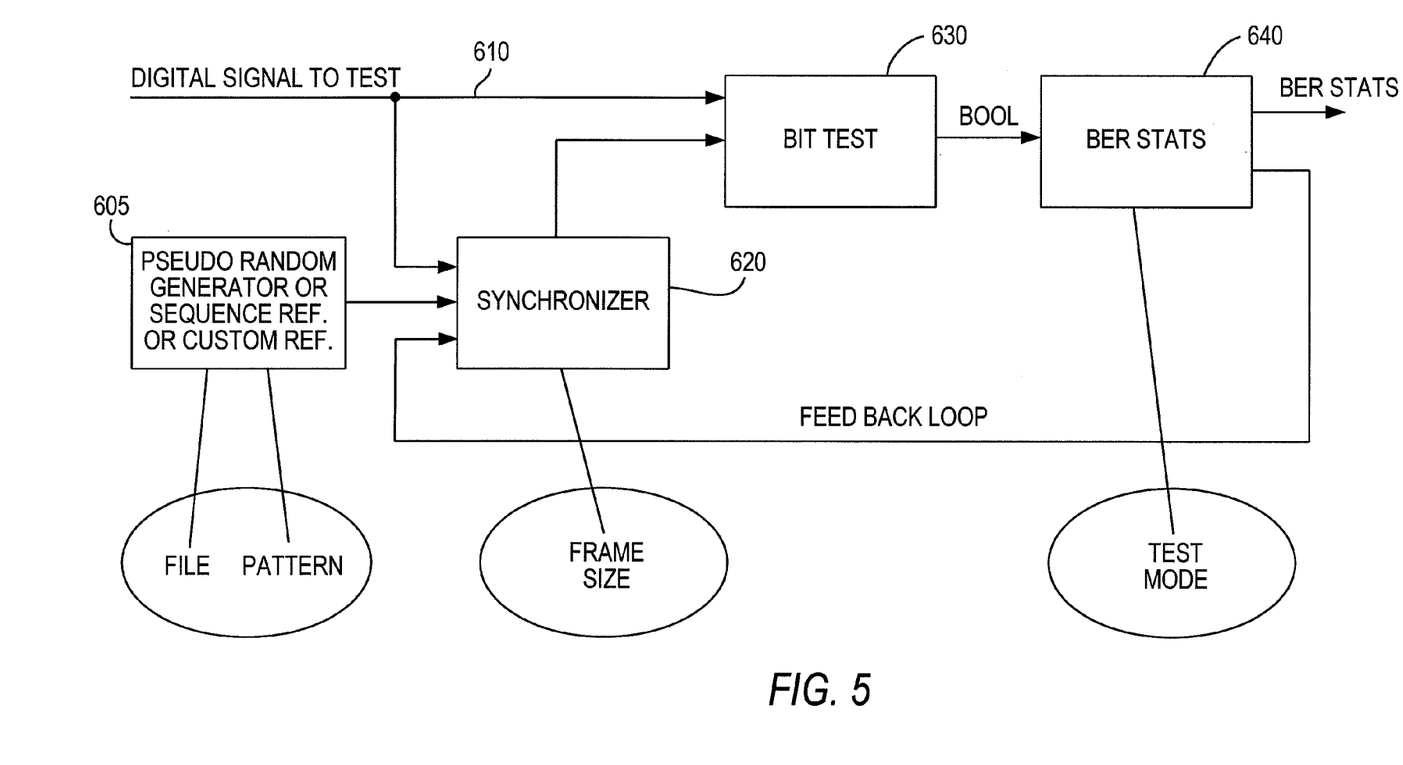
FIG. 5 is a block diagram depicting the comparison of a signal to be tested and a known sequence.

As is shown in FIG. 5, a digital test signal 610 is received, and is fed to a synchronizer 620 and a bit test unit 630. Further, a pseudo randomly generated sequence pattern, a standard reference pattern, or a custom pattern are provided from pattern generator 605 to synchronizer 620. The pattern generator at step 605 generates a known sequence in a loop, using either a user specified pattern, a PRBS Pseudo-random Bit Sequence or a standard pattern. The pattern is the expected bit pattern in the data stream. In step 620, the bits of the data signal pattern and the test pattern are synchronized and the synchronized pattern is provided to bit tester 630, along with the data signal 610. The two data streams are compared bit by bit. For each bit that matches, a 1 (true) is output; if the bits do not match a 0 (false) it output. The bit tester output is sent to the BER statistics accumulator which counts the total number of bits tested, the number of errors which should have been "1"'s and the number of errors which should have been "0"s. Further, if an extremely high bit Error rate is determined when the Bit Error Statistics Unit is in a test mode, this information may be fed back to synchronizer 620 and the alignment is adjusted between the data signal and test pattern to properly align them. The BER of the data stream is the ratio of the total number of failures (number of failed ones+then number of failed zeros) to the total number of bits tested.

Bit Error Location Map

The bit comparison result from the bit tester at step 340 can also be inputted into the Error Map at step 350. The bit compare results are displayed on successive lines of the Y-axis, preferably one frame at a time. A frame is indicated by and is composed of the bits from the end of one frame sync to the start of the next one determined at step 325. If frame sync bits are not specified, the bits are laid out in fixed length rows, starting at the top left corner of the screen and proceeding from left to right and down in a raster pattern. Error bits are shown in different color from the correct bits.

Figure 6:
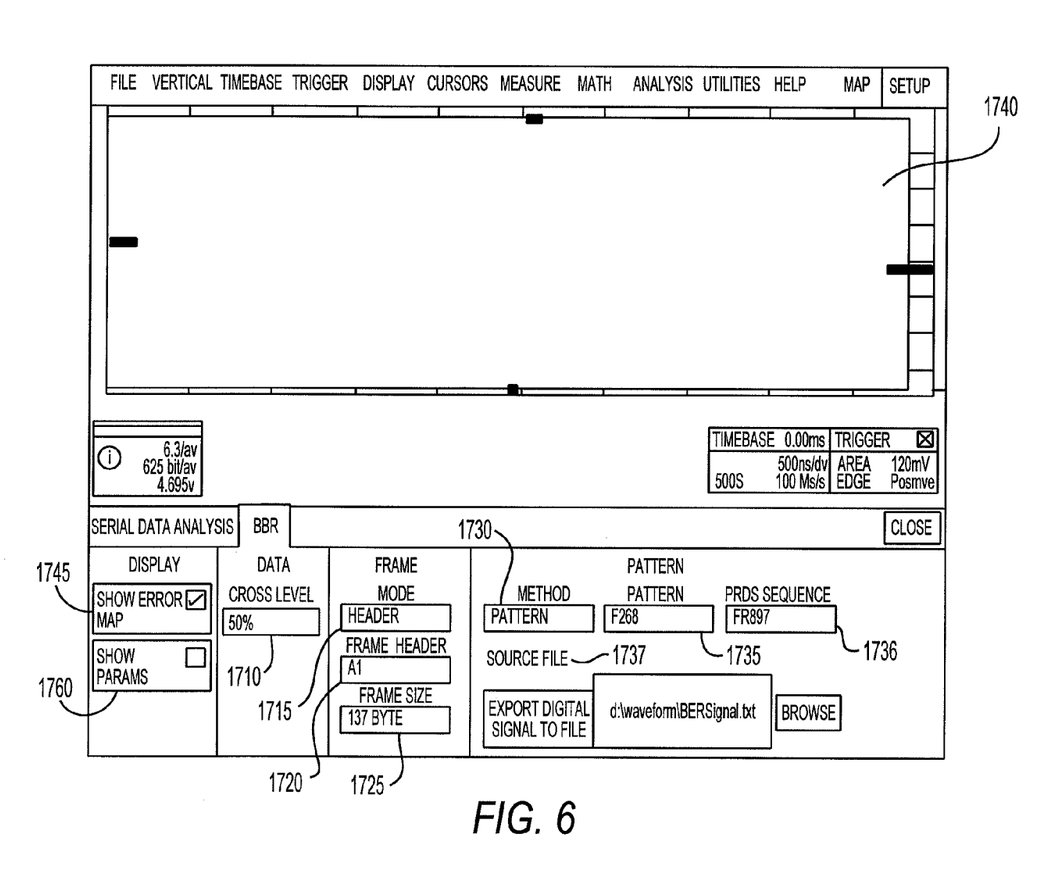
FIG. 6 depicts a user interface for a test measurement apparatus for conducting Bit Error Rate measurements.

FIG. 6 depicts the user controls necessary for direct or actual Bit Error Rate measurements in accordance with the invention. User inputs include the following:

the Cross level field 1710 and enter a threshold level in percent.

the Mode field 1715 specifies the type of frame synchronization to be used. Depending on the selection, Frame header 1720 and Frame size 1725 will need to be set according to the following table:

|  | FRAME HEADER | FRAME SIZE |
| --- | --- | --- |
| Off | no | no |
| Size | no | yes |
| SONET | yes | no |
| Header | yes | no |
| Size and Header | yes | yes |

Method field 1730 allows a user to designate a known pattern, whether a pseudo-randomly generated bit sequence, or a custom pattern in a file will be used. If a known pattern, the pattern name is noted at select Pattern 1735. If a pseudo-randomly generated bit pattern, a seed and algorithm designation is noted at 1736. If a file, it is designated at 1737. The designated pattern is the expected bit pattern that is compared to the data segments in the data stream.

At entry 1745, a user is also able to designate the type of display to be shown.

A Bit Error location landscape may be Displayed as Follows:
a Data waveform or Error map may be displayed on a first displayed grid 1740.
Any other trace may be displayed on a second grid, such as—Math, Memory, etc . . . (not shown).
a Parameters table including user inputs and other parameters 1760 (not shown).

Figure 8:
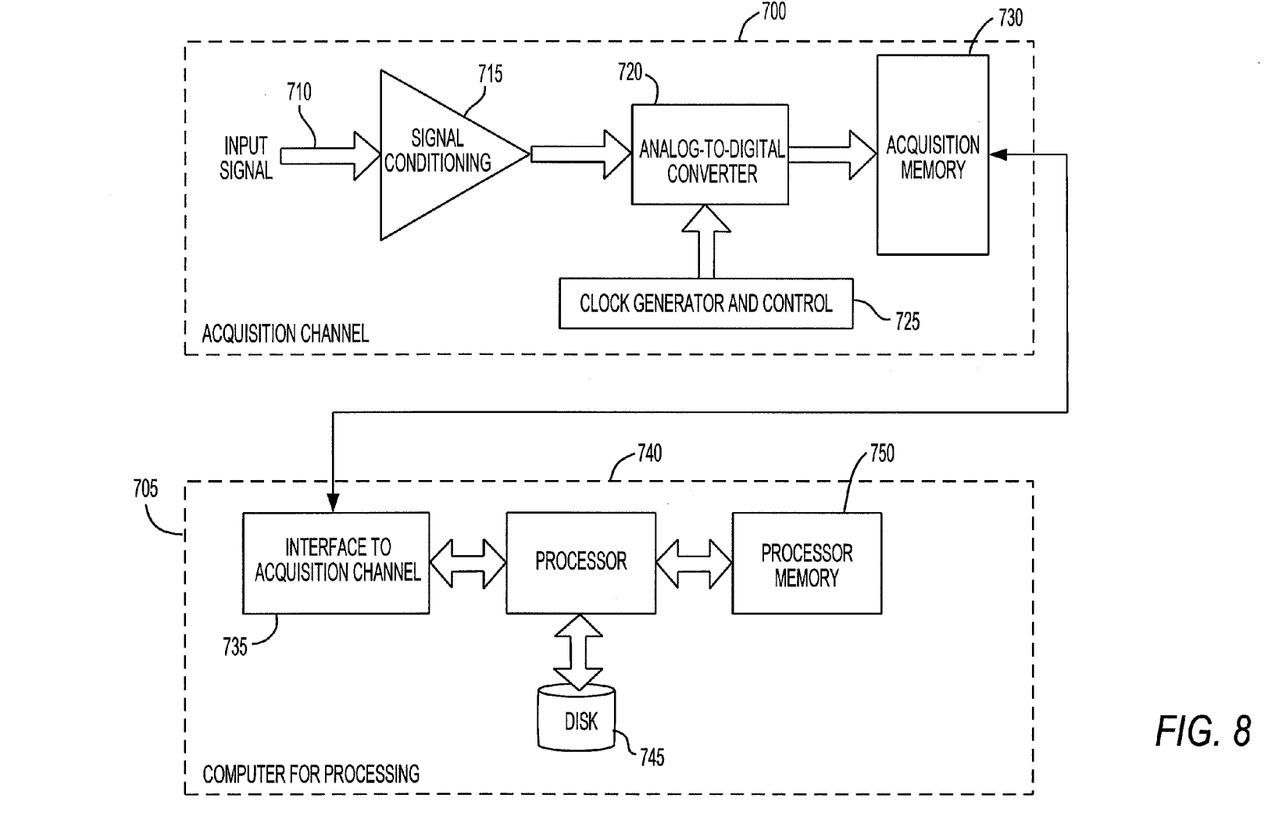
FIG. 8 is a block diagram depicting an apparatus for performing the bit error rate analysis of the invention.

Referring next to FIG. 8, a block diagram representing an apparatus for performing the clock recovery, slicing and bit error testing in accordance with the invention is shown. The apparatus comprises a data acquisition channel 700 and a processing unit 705 for processing various acquired data. Data acquisition channel 700 received an input analog data signal 710, and conditions or processes the signal to insure a clean signal at a signal conditioning unit 715. The conditioned signal is passed to an analog to digital converter 720 that digitizes the acquired, conditioned analog signal. This analog to digital conversion is performed in accordance with an externally generated clock and controller 725. Preferably, in accordance with the invention, the generated clock is very stable, and evidences very little jitter. Once the digitized signal has been formed, this digitized signal is stored in an acquisition memory 730.

When the acquired digital signal is to be processed an interface unit 735 of processing unit 705 retrieves the digitized data signal from acquisition memory 730, and provides the signal to a processor 740. Processor 740 includes a clock recovery unit therein for recovering a clock from the digitized data signal, as described above. Upon recovery of such a clock, the digital data signal is sliced into a plurality of data segments of a predefined length, and store these data segments in a disk storage, or other storage 745. A processor memory 750 is also provided for use by processor 740 during processing. Once the various data segments have been defined, processor 740 is able to perform the various bit error rate testing functions noted above, such as determining bit error rate as described above, and performing any of the other various display functions, and any other functions that might be performed on a plurality of data segments. Therefore, the various bit comparisons described in FIGS. 3 and 5, and the display of FIG. 2 may be implemented by processor 740. Thus, a user is able to determine a bit error rate for a long data signal without relying on a plurality of triggers, but rather by acquiring a long data signal in response to a single trigger, slicing the signal into data segments in accordance with a recovered clock signal, and comparing the bits of the sliced data segments with a known pattern.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for determining a bit error rate, comprising the steps of:
   acquiring a data signal by an acquisition unit of a test instrument for a predetermined period of time;
   storing said data signal in a memory of said test instrument;
   recovering a virtual clock from said stored data signal by establishing a threshold and determining pairs of adjacent samples of said stored data signal that straddle said threshold,
   taking into account a hysteresis requirement to confirm that a determined pair of adjacent samples that straddle said threshold represent a threshold crossing point;
   slicing said stored data signal into a plurality of data segments of a predetermined length in accordance with said recovered a virtual clock;
   synchronizing each of said data segments to align them to a frame or predetermined pattern to determine a bit error rate thereof;
   and comparing each of said data segments to said predetermined pattern on a bit by bit basis.

2. The method of claim 1, wherein said clock recovery step further comprises the steps of:
   comparing each portion of the stored data signal to said threshold level; and
   estimating a time of crossing said threshold between said adjacent samples to obtain a series of observed times of threshold crossing.

3. The method of claim 2, said clock recovery step further comprising the steps of:
   comparing said series of observed times of threshold crossing to an ideal perfectly periodic sequence of expected times of threshold crossing comprising said recovered virtual clock;
   determining an error between said observed times of threshold crossing and of said series of expected times of threshold crossing comprising said recovered virtual clock based upon said comparison; and
   adjusting the phase of said recovered virtual clock in accordance with said determined error.

4. The method of claim 1, further comprising the steps of:
   determining a position of each bit error in a frame; and
   displaying said position of each determined bit error in an x/y display of said frame.

5. The method of claim 1, wherein said predetermined pattern is compared to each of said data segments to determine bit errors therein.

6. The method of claim 5, wherein if said determined bit rate is extremely high above a predetermined threshold, said alignment between the pattern and the data segments is adjusted.

7. The method of claim 1, wherein said predetermined pattern is a pseudo-randomly generated bit sequence.

8. The method of claim 1, wherein said predetermined pattern is a known standard test pattern.

9. The method of claim 1, wherein said predetermined pattern is a custom test pattern stored in a data file.

10. An apparatus for determining a bit error rate, comprising:
    an acquisition unit of a test instrument for acquiring a data signal for a predetermined period of time;
    a memory of said test instrument for storing said data signal;
    a clock recovery unit for recovering a virtual clock from said stored data signal by establishing a threshold and determining pairs of adjacent samples of said stored data signal that straddle said threshold, taking into account a hysteresis requirement to confirm that a determined pair of adjacent samples that straddle said threshold represent a threshold crossing point;
    a processor for slicing said stored data signal into a plurality of data segments of a predetermined length in accordance with said recovered virtual clock;
    a synchronizer for synchronizing each of said data segments to align them to a predetermined pattern; and
    a bit error tester for comparing each of said data segments to said predetermined pattern on a bit by bit basis to determine a bit error rate thereof.

11. The apparatus of claim 10, wherein said clock recovery unit compares each portion of the stored data signal to said threshold level, and estimates a time of crossing said threshold between said adjacent samples to obtain a series of observed times of threshold crossing.

12. The apparatus of claim 11, said clock recovery unit further comparing said series of observed times of threshold crossing to an ideal perfectly periodic sequence of expected times of threshold crossing comprising said recovered virtual clock, determining an error between said observed times of threshold crossing and of said series of expected times of threshold crossing comprising said recovered virtual clock based upon said comparison, and adjusting the phase of said recovered virtual clock in accordance with said determined error.

13. The apparatus of claim 10, said bit error rate tester determining a position of each bit error in a frame, and displaying said position of each determined bit error in an x/y display of said frame.

14. The apparatus of claim 10, wherein said predetermined pattern is compared to each of said data segments to determine bit errors therein.

15. The apparatus of claim 14, wherein if said determined bit rate is extremely high above a predetermined threshold, said alignment between the pattern and the data segments is adjusted.

16. The apparatus of claim 10, wherein said predetermined pattern is a pseudo-randomly generated bit sequence.

17. The apparatus of claim 10, wherein said predetermined pattern is a known standard test pattern.

18. The apparatus of claim 10, wherein said predetermined pattern is a custom test pattern stored in a data file.

* * * * *